United States Patent Office 3,499,847
Patented Mar. 10, 1970

3,499,847
PROCESS FOR CONTROLLING THE MOLECULAR WEIGHT OF ULTRAHIGH MOLECULAR WEIGHT OXYALKYLENE - CONTAINING POLYMERS FROM ALKYLENE OXIDES FREE OF GROUPS OTHER THAN OXIRANE GROUPS
Franklin E. Mange, Rudolf S. Buriks, and Allen R. Fauke, St. Louis, Mo., assignors to Petrolite Corporation, Wilmington, Del., a corporation of Delaware
No Drawing. Filed Aug. 8, 1966, Ser. No. 570,753
Int. Cl. C08g 23/06, 23/14
U.S. Cl. 260—2                    2 Claims

ABSTRACT OF THE DISCLOSURE

Process of controlling the molecular weight of ultrahigh molecular weight oxyalkylene-containing polymers from alkylene oxides free of groups other than oxirane groups, said polymers being for use in preventing, breaking or resolving emulsions of the water-in-oil type, particularly petroleum emulsions, said polymers having molecular weights of 100,000–10,000,000 formed from a copolymer of a hydrophobic alkylene oxide and a hydrophilic alkylene oxide which contains more than 50 mole percent hydrophobic alkylene oxide, wherein the alkylene oxides are contacted with an alkyl metal-chelate-water catalyst under polymerization conditions characterized by using a minor amount of water to alkyl metal, for example, aluminum and zinc, in the presence of varying amounts of chelate This invention relates to ultrahigh molecular weight polymers and to the use of ultrahigh molecular weight polymers, such as in preventing, breaking or resolving emulsions of the water-in-oil type, and particularly petroleum emulsions Their use provides an economical and rapid process for resolving petroleum emulsions of the water-in-oil type that are commonly referred to as "cut oil," "roily oil," "emulsified oil," etc. and which comprise fine droplets of naturally-occurring waters or brines dispersed in a more or less permanent state throughout the oil which constitutes the continuous phase of the emulsion.

These novel demulsifying agents also provide an economical and rapid process for breaking and separating emulsions which have been prepared under controlled conditions from mineral oil, such as crude oil and relatively soft waters or weak brines. Controlled emulsification and subsequent demulsification, under the conditions just mentioned, are of significant value in removing impurities, particularly inorganic salts, from pipeline oil (i.e. desalting).

Demulsification, as contemplated in the present application, includes the preventive step of commingling the demulsifier with the hydrocarbon phase. Similarly, such demulisfier may be mixed, emulsified, suspended, etc. in the aqueous component.

Heretofore, many polymers have been employed in resolving W/O emulsions. However, most of these polymers are of relatively low molecular weights, for example, polymers having a molecular weight of 2,000 to about 10,000. It has been thought undesirable to employ polymers having molecular weights in excess of this upper range.

We have now discovered that ultrahigh molecular weight polymers are unexpectedly superior to low molecular weight polymers in resolving W/O emulsions, i.e. polymers having molecular weights of at least about 100,000, such as 100,000 to 10 million, for example 200,000 to 5 million, but preferably 300,000 to 3 million with an optimum of about 0.5–2 million; with the proviso that the polymer be (1) essentially water insoluble, i.e. soluble to the extent of less than about 0.1% by weight in water and (2) essentially solvent soluble in a solvent other than water, and preferably soluble in aromatic type solvents, for example having a solubility of at least about 1% by weight, but preferably at least about 5% in an aromatic solvent.

These solubilities may be in an aromatic hydrocarbon solvent alone (benzene, toluene, etc.), or in conjunction with other solvents, for example, lower alkanols (1–50% alkanol in aromatic solvent) such as methanol, ethanol, propanol, etc.

Since these polymers are of ultrahigh molecular weight, they form viscous solutions above certain concentrations, such as at about 5–10%. The higher molecular weight polymers form extremely viscous solutions even at 2%. These polymer solutions are sometimes so viscous they barely flow. In fact, many of these polymer solutions, although infinitely soluble in the solvent, are in essence solid solutions.

Since it is often difficult to accurately determine molecular weights, we prefer to characterize these polymers by their viscosity properties and more specifically by their intrinsic viscosity as determined in a good solvent, for example benzene at 33° C. The polymers of this invention have intrinsic viscosities in benzene of at least about 0.7, such as from about 1 to 30, for example from about 1.5 to 15, but preferably from about 2 to 12.

Provided they meet these parameters we prefer that the high molecular weight polymers be relatively linear, i.e. that they not be so cross-linked as to be too insoluble in the organic solvent. They may be long chain branched, though preferably not to an excessive degree. Short chain branching may exist and indeed is often present, except in a few cases such as linear polyethylene, polyethylene oxide, etc., since most monomers when polymerized will give short chain branching (i.e. methyl, methoxy, carboethoxy, acetoxy, isopropoxymethyl, phenyl, phenoxyalkyl, etc.). Because of these high molecular weights, many of these polymers are tough rubbery materials.

Furthermore, we prefer that the polymers of this invention do not contain a large plurality of alcoholic OH or amino NH groups. For example, preferably up to two or three of these groups, but no more than about 5 per 50,000 molecular weight are satisfactory as their effect would be masked by other groups present. However, greater amounts of these hydroxy or amino groups appear to detract from the effectiveness of the polymers. Our polymers are superior to comparable materials with a large number of OH or NH groups. A wide variety of ultrahigh molecular weight polymers may be employed. Polymers of the following types have shown value as demulsifiers. This is unexpected since, in general low molecular weight materials of the same type have shown either a lesser order of activity or no activity.

(1) Polymers derived by polymerizing or copolymerizing monomers through carbon unsaturation

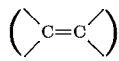

For example this may be done via cationic, anionic or free radical systems, the major requirement being that high molecular weight products be formed. Included in this group are polymers formed from vinyl ethers, vinyl esters, compounds of the type

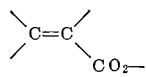

such as the acrylates or maleates, vinyl aromatics (copolymers), olefins (copolymers), nitrogen-containing monomers such as vinyl amides and acrylonitrile, phosphorous-containing monomers, sulfur-containing monomers, etc.

For example vinyl ethers may be polymerized using boron trifluoride at low temperatures such as employed by Schildknecht et al., Ind. Eng. Chem., 40, 2104 (1948), or metal alkyl systems such as described by Vandenberg, J. Polm. Sci. Pt. C (1) 207–36 (1963). Vinyl ethers such as methyl vinyl ether, ethyl vinyl ether, propyl vinyl ether, 2-methoxyethyl vinyl ether, 2-butoxy-2-ethoxy ethyl vinyl ether, etc. may be employed.

Polymers from vinyl esters may be employed such as those from vinyl acetate, vinyl propionate, vinyl butyrate, vinyl benzoate, etc. Copolymers of vinyl esters, such as ethylene-vinyl acetate copolymers, may also be employed. In this latter type, there should be more than 30% by weight of vinyl acetate in the copolymer. These copolymers can be prepared by a free radical high pressure process as described on pages 337–339 in Crystalline Olefin Polymers, part I (vol. XX of "High Polymers"), editors R. A. V. Raff and K. W. Doak, John Wiley & Sons, Inc., (1965).

Other copolymers of ethylene and olefins may be employed, i.e. copolymers with vinyl ethers, acrylates, methacrylates, maleates, fumarates, carbon monoxide, etc., which are described on pages 339, 340, 343–345, 346–348, in the book Crystalline Olefin Polymers, hereinabove referred to.

Polymers and copolymers based on acrylates and methacrylates may be employed where esters of methanol, ethanol, propanol, butanol, higher alcohols, 2-methoxyethanol, 2-butoxy-2-ethoxyethanol, 2-isopropoxy-2-methylethanol, etc., may be used. These may be prepared by employing free radical or organo metallic catalysts. Copolymers with styrenes, vinyl amides, etc., in addition to olefins (described above) may also be employed.

Maleate and fumarate esters derived from alcohols above listed may also be copolymerized with styrenes, acrylates, methacrylates, olefins, vinyl amides (i.e. vinyl pyrrolidine), etc.

Other vinyl polymers can be used such as copolymers from acrylonitrile, styrene, substituted styrenes, vinyl amides (i.e. vinyl pyrrolidine, vinyl acetamide, etc.), vinyl pyridine, etc. We prefer that these monomers be polymerized with oxygen containing monomers to introduce a controlled amount of hydrophilicity to our polymers.

Furthermore, polymers from esters and ethers of vinyl phenols, from vinyl phosphonates and other phosphorous-containing polymers, vinyl ketones, etc. (i.e. methyl vinyl ketones), yield effective demulsifiers.

(2) Polyoxyalkylene compounds: These polymers contain carbon and ether oxygen in the backbone and are prepared by homo- or co-polymerizing aldehydes, epoxides, oxetanes, tetrahydrofuran, etc. Polymers of this type are well described in the book Polymerization of Aldehydes and Oxides (vol. 3 of "Polymer Reviews," H. F. Mark and E. H. Immergut, editors) by Furukawa and Saegusa, John Wiley & Sons, Inc. 1963, and in the review by A. E. Gurgiolo, Reviews in Macromolecular Chemistry 1 (1) 39–190 (1966).

Aldehydes may be polymerized to high molecular weights using any of several polymerization systems (i.e. cationic, radiation organometallic, etc.). Homopolymers of formaldehyde are too insoluble but higher aldehydes, i.e. propionaldehyde, butyraldehyde may be used. Copolymers of aldehydes with other aldehydes, epoxides, oxetanes, tetrahydrofurans, vinyl compounds, can be made. Similar polymers may be obtained from homo and copolymers of cyclic formals such as those from 1,3-dioxolane, dioxepane, pentamethylene formal, diethyleneglycol formal, dipropyleneglycol formal, etc.

Polymers from alkylene oxides can be used when of sufficiently high molecular weight. These can be made from organometallic catalyst systems. These are our preferred polymers and are described in greater detail hereinafter. Copolymers of these oxiranes with aldehydes, cyclic formals (or acetals, etc.), oxetanes and olefins may also be used to advantage.

Furthermore, certain oxetane and tetrahydrofuran homo- and copolymers (i.e. with cyclic formals) may be used, for example, oxetane, 2,2-diethoxy-methyl oxetane, 2,2-diacetoxy-methyl oxetane, tetrahydrofuran, etc.

(3) Other polymers: Many other types of high molecular weight polymers would advantageously produce effective demulsifiers. However, difficulty in achieving high molecular weight often occurs. Polyesters are an example. Interfacial polymerization (J. Polym. Sc. 40, 289, et seq. (1959) between a di-acidchloride and a diol may be employed where applicable. Polyamides can be produced from diamines and diacidchlorides. Certain types of polyesters and polyamides, i.e., polyurethanes can be prepared within the desired molecular weight region by using carefully purified reagents. It is preferable to use diisocyanates such as diphenylmethane diisocyanate (4,4' isomer preferred) 2,4-toluene-diisocyanate (TDI), etc., condensed with polyoxylkyleneglycols or polyesters which have been carefully purified so that they are essentially difunctional. Condensation is best carried out at temperatures up to about 100°, preferably from room temperature up to 80° in a non-reactive solvent (i.e. toluene) combining reagents in an equal molar ratio. The reaction is desirably catalyzed by organometallics such as dibutyltin dilaurate, nickel octoate, etc. Alternatively prepolymers may be prepared by reacting one mole of a diol, a diacid, or combination with two moles of TDI followed by reaction with one mole of water a diol, a diamine (i.e. ethylene diamine, hexamethylene diamine, "Duomeens," etc.) diacids or combinations.

Polysulfones may also be used. These may be prepared by copolymerizing sulfur dioxide with certain substituted olefins. These polymerizations can best be carried out at room temperature or lower. There is often an upper ceiling temperature which cannot be exceeded using sulfur dioxide as solvent. The reaction is catalyzed with silver nitrate, peroxide, or sometimes the polymerization is autocatalytic. This polymerization is described by Futty et al. in J. Polym. Sci., part A, 3, 2781 (1965) and Vanhaeren and Butler, Preprints A.C.S. Div. Polym. Chem., Atlantic City Meeting 6, (2). 709 (1965) along with the references cited therein. Unsaturated compounds that can be polymerized with sulfur dioxide either singly or in combination are styrenes, alkyl ethers (i.e. allyl methyl ether, allyl ethyl ether, allyl propyl ether, higher allyl alkyl ethers, allyl phenyl ether, allyl alkylphenyl ethers, allyl phenoxyethyl ether, etc.), allyl esters (i.e. allyl acetate, allyl propionate, higher allyl esters), α-olefins (i.e. 1,2-butene, 1,2-pentene, 1,2-hexene, etc.), cyclic olefins, etc. Polysulfones may also be prepared from divinyl sulfone which can be condensed with appropriate di-secondary amines or dimercaptans or related compounds.

High molecular weight polymers of other monomers such as ketenes and substituted ketenes, acetylenes, N-alkylethylenimines, etc., may also be employed.

This invention will be illustrated by ultra-high molecular weight polymers of alkylene oxides which contain a sufficient number of hydrophobic oxyalkylene units in the polymer chain to make them substantially insoluble in water but soluble in organic solvents. Hydrophobic oxyalkylene units are defined herein as being derived from alkylene oxides having more than two carbon atoms. Examples of hydrophobic alkylene oxides are oxides of the general formula

where A is a group forming part of a 1,2-epoxy group and has three or more carbon atoms. Illustrative examples are oxirane compounds of the formula

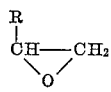

where R is, for example, alkyl but preferably lower alkyl—i.e. methyl, ethyl, propyl, butyl, etc. The preferred alkylene oxide is propylene oxide. Ethylene oxide, which yields oxyethylene units, is a hydrophilic alkylene oxide. These polymers include homopolymers of a hydrophobic alkylene oxide, copolymers of two or more hydrophobic oxides or one or more hydrophobic oxides in conjunction with ethylene oxide or other hydrophilic oxides described more fully hereafter.

In certain instances where the alkylene oxide contains a substituted group, an oxide which contains three or more carbon atoms may be classified as a hydrophilic alkylene oxide. For example, certain glycidyl compounds of the

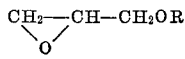

type having three carbon atoms or more may be considered hydrophilic alkylene oxides since the second oxygen in the molecule renders the polymer water-soluble. Therefore, a hydrophobic oxide in the broad sense is one in which the atomic ratio of carbon to oxygen is 2.5 or greater.

The copolymers of this invention include random and block copolymers of hydrophobic oxides or hydrophobic oxides in conjunction with ethylene oxide and/or other hydrophilic oxides. Thus, the copolymers may be di-, ter- or higher copolymers containing one or more hydrophobic oxides in conjunction with ethylene oxide and/or other hydrophilic oxides.

By an ultra high molecular weight hydrophobic polyalkylene oxide polymer, we mean a substantially water insoluble, organic solvent soluble polymer. In general, we prefer that they be soluble in such solvents as aromatics, ketones, alcohols, etc., or mixtures thereof.

Polymers of alkylene oxides and methods for polymerizing alkylene oxides are well known. For example alkylene oxides are polymerized by the following catalyst systems.

(1) Stepwise anionic polymerization systems such as those catalyzed by alkali;

(2) Cationic polymerization systems such as those catalyzed by Lewis acids;

(3) Coordinate anionic polymerization systems such as those catalyzed by:

(a) Metal-oxygen bond catalytic systems, for example:

| Type | Example |
| --- | --- |
| Metal alkoxide Me $(OR)_x$— Me: II and III groups: | $Al(OR)_3, Mg(OR)_2, Zn(OR)_2$ |
| Complex metal alkoxide | $Mg/2[Al(OPri)_4]$<br>$Ca/2[Al(OPri)_4]$ |
| Metal alkoxide+metal salt | $Al(OPri)_3$-$ZnCl_2$<br>$Al(OPri)_3$-$FeCl_2$<br>$Ti(OPri)_4$-$ZnCl_2$ |
| Partially hydrolyzed aluminum alkoxide. | $Al(OR)_3$-$H_2O$ |
| Ferric alkoxide | $Fe(OEt)_3, Fe(OCH_2CH_2Cl)_3$ |
| Partially hydrolyzed ferric alkoxide. | $Fe(OR)_3$-$H_2O$<br>$ClFe[(OCH_2CH(CH_3)Cl]_2$-$H_2O$ |
| Ferric chloride-alkylene oxide complex. | $FeCl_3$-PO complex<br>$FeCl_3$-2-butene oxide complex<br>$FeCl_3$-ECH complex |
| Organometallic compound | $AlR_3, R_2AlCl, R_2AlOR, R_2AlH, RZnOR$<br>$BR_3$<br>$AlR_3, ZnR_2, R_2AlCl$ |
| Organometallic compound+ metal halide. | $AlEt_3$-$FeCl_3$<br>$AlEt_3$-NaF, $ZnEt_2$-$CaF_2$ |
| Organometallic compound+ $H_2O$, alcohol. | $ZnEt_2$-$H_2O$<br>$Al_2(CH_3)_6$-$H_2O$<br>$AlR_3$-$H_2O$, $R_2AlCl$-$H_2O$,<br>$RAlCl_2$-$H_2O$, $R_2AlOR$-$H_2O$ |
| Organometallic compound+ chelating agent and/or $H_2O$. | $AlR_3$-acetylacetone, $AlR_3$-acetylacetone-$H_2O$, $AlR_3$-diethylmalonate, etc. |
| Organometallic compound+ chelated compound of transition metal. | $AlR_3$-acetylacetonate of Ti, Cr, V, Fe, Co |
| Acidic oxide | Alumina |
| Acidic oxide+organometallic compound. | Alumina-$ZnEt_2$, Alumina-$AlEt_3$, Silica-alumina-$ZnEt_2$, -$AlEt_3$ |
| Metal oxide+diethylzinc | $ZnEt_2$-$Bi_2O_3$, -MgO, -CaO, -BaO, -SnO, -ZnO |

(b) Alkaline earth compound catalytic systems, for example:

| Type | Example |
| --- | --- |
| Alkaline earth oxide | CaO, SrO<br>CaO, SrO, BaO (size <4,000 A.) |
| Alkaline earth carbonate | $SrCO_3, CaCO_3, La_2(CO_3)_3$ |
| Alkaline earth alkoxide | $Sr(OR)_2, Ca(OR)_2$ |
| Alkaline earth amide-alkoxide | $Ca(OR)NH_2$ |
| Alkaline earth amide | $Ca(NH_2)_2, Sr(NH_2)_2$<br>$Ba(NH_2)_2, Zn(NH_2)_2$ |
| Alkaline earth hexaammoniate | $Ca(NH_3)_6$ |
| Alkaline earth chelated compound | Ca-, Ba-, Sr-acetoacetic ester chelate, Ca-acetoaceto-o-aniside, etc. |
| Alkaline earth carboxylate | Ca-acetate, oxalate, stearate, etc. |
| Alkaline earth sulfate | $CaSO_4, MgSO_4, ZnSO_4$ |

(c) Miscellaneous catalytic systems, for example:

| Type | Example |
| --- | --- |
| Ferric compound | $Fe(OH)_3, FeCl_3.6H_2$<br>$Fe(OOC.CH_3)_3$ |
| Stannous carboxylate | $Sn^{II}$-oxalate, -caproate, -caprylate, -laurate |
| Manganous and cobaltous carboxylates. | $Mn^{II}$ acetate, $Co^{II}$-naphthenate |

The polyalkylene oxides of this invention have a molecular weight of from at least about 100,000 up to 10 million or greater, for example, from about 200,000 to 5 million but preferably from about 300,000 to 3 million and are in general insoluble in water but soluble in organic solvents. For convenience, viscosity rather than molecular weight measurements are generally employed, i.e. intrinsic viscosities in benzene at 33° C. of at least about 0.7 such as from about 1 to 30, for example from about 1.5 to 5, but preferably from about 2 to 12.

Although any method of producing the ultra high molecular weight polymers of this invention can be employed, the most effective way of producing the ultra high molecular weight polymers is by coordinating anionic polymerization systems such as described in 3(a), 3(b), and 3(c) above.

Excellent discussions of polyalkylene oxides are contained in Polymerization of Aldehydes and Oxides, Furukawa and Saegusa particularly on pages 128-208 and in the patents cited in pages 332-364, and also by A. E. Gurgiolo, Reviews in Macromolecular Chemistry 1 (1) 39-190 (1966), both of which were referred to hereinabove. These texts are by reference incorporated into the present application as if a part hereof.

The term "alkylene oxide," as used herein means a compound containing the following 1,2-epoxy group, also called an oxirane group, i.e.

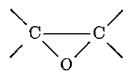

and wherein each unsatisfied epoxy carbon valence of said group is satisfied for example by hydrogen, a hydrocarbon radical, a substituted group for example an ether-containing group, a halogen-containing group, or other radicals which do not interfere with the polymerization process. In addition, the unsatisfied epoxy carbon valences collectively can represent a divalent aliphatic hydrocarbon radical which together with the epoxy carbon atoms form a ring containing, for example, from 5 to 10 carbon atoms inclusive. It is to be understood, also, that the term "lower alkylene oxides" designates that each unsatisfied epoxy carbon valence of the above-depicted structural unit can be satisfied by hydrogen, a lower alkyl, e.g. methyl, ethyl, propyl, etc., sustituted derivatives thereof, and the like.

For example, the monomeric alkylene oxides employed, are vicinal-epoxyhydrocarbons which have a single vicinal epoxy group which can be characterized by the following formula:

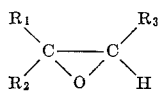

wherein $R_1$, $R_2$, and $R_3$ are hydrogen, a hydrocarbon radical, a haloalkyl or aryl radical, an ether-containing radical or other types that do not interfere with the polymerization procedures such as certain nitrogen containing derivatives sulfur-containing groups, ester groups, etc.

Representative alkylene oxide monomers which can be employed are those in which $R_2$ and $R_3$ are hydrogen and $R_1$ is an organic radical such as alkyl, aryl, halogen-containing alkyl or aryl, ether-containing alkyl or aryl, unsaturated alkyl, ester-containing alkyl or aryl or mixtures of these types. Specific examples are ethylene oxide (wherein $R_1$ is also hydrogen), 1,2-pentene oxide, 1,2-hexene oxide, 1,2-octene oxide, 1,2-decene oxide, 1,2-dodecene oxide, propylene oxide, 1,2-butylene oxide, higher 1,2-epoxy alkanes, styrene oxide, o-, m-, or p-alkyl-styrene oxide, epichlorohydrin, epibromohydrin, epifluorohydrin, 1,1,1-trifluoro-2-propylene oxide, chlorostyrene oxide, methyl glycidyl ether, ethyl glycidyl ether, isopropyl glycidyl ether, methyl glycidyl ether of propylene glycol, methyl glycidyl ether of dipropylene glycol, methyl glycidyl ether of tripropylene glycol, hexyl glycidyl ether, b-chloroethyl glycidyl ether, phenyl glycidyl ether, benzyl glycidyl ether o-, m-, and p-chlorophenyl glycidyl ether, o-, m-, and p-methylphenyl glycidyl ether, butadiene monoxide, chloroprene monoxide, allyl glycidyl ether, glycidyl methacrylate, glycidyl pivalate, trimethylsilyl glycidyl ether, butyl glycidyl formal, diethylglycidyl amine, N-(2,3-epoxypropyl) morpholine, N,N-dimethyl aminoethyl glycidyl ether, etc.

Other representative epoxides which can be used are those in which $R_3$ is hydrogen and both $R_1$ and $R_2$ are organic radicals generally defined as above for $R_1$. Specific examples are, isobutylene oxide, α-methyl styrene oxide, 1,1-diphenylethylene oxide, 1,1,1-trifluoro-2-methyl-2-propylene oxide, methylmethacrylate oxide, methylene cyclohexane oxide, etc.

Other representative epoxides which can be employed are those in which $R_2$ is hydrogen and $R_1$ and $R_3$ are organic radicals generally defined as above. Specific examples are cis- and trans- 2-butene oxide, 1,1,1-trifluoro-2-butene oxide, cyclohexene oxide, vinyl cyclohexene oxide, etc.

Trisubstituted ethylene oxides can also be employed in which $R_1$, $R_2$ and $R_3$ are all organic radicals as defined above. Trimethyl ethylene oxide is illustrative of this type. Furthermore tetrasubstituted ethylene oxides may be employed such as tetramethyl ethylene oxide.

It is preferred that the oxide be a monosubstituted ethylene oxide type in which $R_2$ and $R_3$ are hydrogen as described above. If a homopolymer is used, then it is preferred that a lower alkylene oxide be employed. In polymerizing an admixture comprising two different alkylene oxides, it is further preferred that one of the alkylene oxides be a lower alkylene oxide.

Homopolymers of ethylene oxide cannot be used in this invention. It is believed that this is true because they are too water-soluble and even though they show solubility in organic solvents, they partition into the aqueous phase during the demulsification process where they are largely ineffective. However, ethylene oxide can be part of a copolymer composition. Its use in a copolymer is particularly beneficial in that it gives a balanced solubility due to its hydrophilic nature. Thus, when higher alkylene oxides are used it is often advantageous to copolymerize them with ethylene oxide. Where propylene oxide is used, some ethylene oxide may be advantageously employed, generally in amounts of less than 50 mole percent but preferably less than 30 mole percent. Other hydrophilic oxides such as methyl glycidyl ether (which like ethylene oxide have a carbon to ether oxygen ratio of 2 to 1) display activity somewhat related to ethylene oxide, and here again it is necessary to use copolymers with hydrophobic oxides. Thus, in general, the term hydrophobic oxide includes compounds in which the carbon to oxygen ratio would preferably be greater than about 2:5. The water insoluble organic solvent soluble polymers may be homopolymers, heteric polomyers prepared by polymerizing a mixture of oxide monomers, block copolymers or mixtures of these types. The polymer can be prepared from one oxide to give homopolymers. If a blend of oxides is used, copolymers are formed containing varying contents of the oxides depending upon the mole ratio of oxides in the original reaction mixture and the relative rates of reaction of the individual oxides with the growing polymer ends. To vary the composition mixture of polymer one can also add oxides to the reaction mixture during the polymerization or after the monomer or monomers have been essentially all converted to the polymer. By proper mode of addition, it is possible to achieve a more uniform copolymer composition or to produce on the other extreme, block copolymers and/or homopolymeric mixtures.

It is normally difficult to readily determine molecular weight for many of the polymers of alkylene oxides described in this invention. For this reason, the molecular weights of the polymers are largely defined by viscosity measurements. These can in special cases be readily converted to viscosity molecular weights.

The intrinsic viscosity of a polymer is a measure of the size and shape of the polymer and thus is an indication of its molecular weight, the unit employed herein is dl./g. (deciliters per gram). Intrinsic viscosity can be obtained by plotting reduced viscosity against concentration and extrapolating to zero concentration. The reduced viscosity of a polymer is obtained by dividing the specific viscosity by the concentration of the copolymer in solution, the concentration being measured in grams of polymer per 100 ml. of solvent; the specific viscosity is obtained by dividing the difference between the viscosity of the solution and the viscosity of the pure solvent by the viscosity of the solvent. The term "reduced viscosity" is described on page 128 of "Textbook of Polymer Chemistry" by Billmeyer, Interscience Publishers, 1957. The relationship of the intrinsic viscosity to reduced viscosity is given in the Huggins equation in "High Polymers, vol. II—Physical Chemistry of High Polymeric Systems" second edition, by H. Mark and A. V. Tobolsky, Interscience, New York (1950), page 301. A further description of "intrinsic viscosity" and its relation to molecular weight appears in pages 308 to 314 of "Principles of Polymer Chemistry." P. J. Flory.

The intrinsic viscosity can be related to a viscosity molecular weight by the expression $$[\eta] = KM^a$$

where $[\eta]$ is intrinsic viscosity, M is viscosity molecular weight and where K and $a$ are constants. Unless otherwise stated viscosities are run in benzene as solvent at 33° C. To determine molecular weight values for polypropylene oxide the values used for the constants are $$K = 1.12 \times 10^{-4}$$
$$a = 0.77$$

These values were obtained for benzene solvent at 25° C. as described by G. Allen, C. Booth and M. N. Jones, Polymer, 5, 195 (1964). It is not expected that an eight degree change in temperature would affect this relationship (note p. 199 of the above cited reference). Benzene is a good solvent for this polymer.

Polymers and copolymers other than polypropylene oxide will generally show a different relationship between intrinsic viscosity and molecular weight. If the other polymer displays a lesser solubility in benzene than polypropylene oxide they will tend to have a higher molecular weight for the same intrinsic viscosity.

The intrinsic viscosities of the polymers used in this invention are desirably within the range of about 1 to 30 or higher, more preferably between 1.5 and 15, and most desirably from 2 to 12.

The polymerization reaction may be carried out by any desired means, either as a batch or continuous process with the catalyst added all at one time or in increments during the polymerization or continuously throughout the polymerization. If desired, the monomer may be added gradually to the polymerization system. It may be carried out as a bulk polymerization process, in some cases at the boiling point of the monomer (reduced or raised to a convenient level by adjusting the pressure) so as to remove the heat of reaction. It may also be carried out in the presence of an inert diluent. Any diluent that is inert under the polymerization reaction conditions may be used as, for example, ethers such as the dialkyl, aryl or cycloalkyl ethers such as diethyl ether, dipropyl ether, diisopropyl ether, dioxane, aromatic hydrocarbons such as benzene, toluene, xylene, mesitylene, naphthalene, etc., or saturated aliphatic hydrocarbons and cycloaliphatic hydrocarbons such as n-heptane, cyclohexane, etc. Obviously, any mixture of such diluents may be used and in many cases is preferable.

Any of the polymerization catalysts referred to herein may be employed. However, it is preferably to employ certain metal alkyl systems such as trialkyl aluminum-acetyl acetone-water or dialkyl zinc-water, etc., as illustrated in the specific examples.

Any suitable amount of these catalysts may be used to catalyze the process in accordance with this invention from a minor catalytic amount up to a large excess, but in general will be within the range of from about 0.2 to about 10 mole percent of the aluminum compound based on the monomer being polymerized, and preferably will be within the range of from about 0.5 to about 5 mole percent. The amount of catalyst used depends in part on such factors as monomer purity, diluent purity, etc., less pure epoxides requiring more catalyst to destroy reaction impurities. In order to decrease catalyst consumption it is generally preferred that impurities such as carbon dioxide, oxygen, aldehydes, acids, alcohols, etc., be kept at as low a level as practical.

The polymerization process in accordance with this invention may be carried out over a wide temperature range and pressure. Usually it will be carried out at a temperature from about −80° C. up to about 150° C., preferably within the range of from about −50° C. to about 120° C., and more preferably from about −30° C. to about 100° C. Usually, the polymerization process will be carried out at autogenous pressure, but superatmospheric pressures up to several hundred pounds may be used if desired, and in the same way, subatmospheric pressures may also be used.

The polymerization reaction time may vary from an hour or less to as long as a week or longer. In general, the higher the temperature (at least up to the range of near 100° C.), and the greater the catalyst concentration, the faster the polymerization, and therefore, the shorter the reaction time. We prefer to carry out the polymerization using conditions such that relatively good yields of polymer can be obtained in 4–24 hours.

It is generally not necessary to isolate the polymer. The reaction product can be employed directly after destroying the catalyst with alcohol, water or acid and adjusting the solvent (i.e. adding aromatic extracts, removing more volatile ones) or blending with other appropriate demulsifiers. It may at times be appropriate to add oxidation inhibitors such as phenothiazine, etc.

The following examples are presented for purposes of illustration and not of limitation. All of the examples described in the table were prepared in the manner described in the general procedure.

GENERAL PROCEDURE

The catalyst was prepared by combining trialkyl aluminum, acetyl acetone and water in a molar ratio of 1.0:0.5:0.33. To 87 ml. of hexane was added 13 ml. (0.05 mole) of triisobutyl aluminum. A mixture of 50 g. (0.50 mole) of acetyl acetone and 6.0 g. (0.33 mole) of water was diluted to a volume of 100 ml. with dioxane. Five ml. of this latter solution was added to the trialkly aluminum solution with stirring. The temperature was about 65° C. After the solution cooled, the evaporated hexane was replaced to give a total volume of 100 ml. One ml. of this solution contained 0.5 mole trialkyl aluminum. When tripropyl aluminum or diethyl zinc was used, the same catalyst system preparation was employed using 0.05 mole of those latter catalysts. When other ratios of co-catalyst were used (as indicated in the following table) the molar ratio of reagents were adjusted keeping other conditions constant.

Into each soda bottle was added catalyst solution, solvent and alkylene oxide as indicated in the following tables. The bottles were capped and placed in a constant temperature bath (or at room temperature) for varying periods of time. The polymers were worked up by diluting the reaction product with ether-containing 3% alcohol, washed with 3% HCl, once with water, once with 2% NaHCO₃ and once again with water. The solutions were treated with 0.5% phenothiazine (based on the original oxide) evaporated and finally dried under vacuum.

Reagents and equipment were conditioned as follows: Solvents were dried over calcium hydride and flushed with nitrogen before use. Acetyl acetone was dried over sodium carbonate redistilled and flushed with nitrogen. Propylene oxide and ethylene oxide were used as received. Other oxides were distilled, dried over calcium hydride and restilled. All glassware was baked at 125–175° C. and cooled under nitrogen. All manipulations and preparations were carried out in a dry box in pure nitrogen atmosphere.

TABLE I

| | Catalyst System | | | Monomer | | Reaction | | | | Product | | | |
|---|---|---|---|---|---|---|---|---|---|---|---|---|---|
| Ex. | Mole Ratio | Cat. Soln,[1] ml. | Metal Alkyl to Oxide, mole Percent | Name, g. (moles) | Name, g. (moles) | Solvent, ml. | Time, hrs. | Temp. (°C) | Appearance | Yield G. | Yield Percent | $[\eta]$ dl./g. | MW· $10^{-6}$ |
| 1 | Tiba:Acac:H₂O 1:0.5:0.33 | 12.5 | 2.5 | PrO, 14.5 (0.25) | | Hexane, 50 | 7 | 25 | Tough snappy rubber. | 8.2 | 57 | 7.2 | [2] 1.7 |
| 2 | Tiba:Acac:H₂O 1:0.5:0.33 | 12.5 | 2.5 | PrO, 14.5 (0.25) | | Hexane, 25 | 96 | 25 | ...do | 13.6 | 94 | 6.9 | 0.7 |
| 3 | Tiba:Acac:H₂O 1:0.5:0.33 | 6.3 | 1.25 | PrO, 14.5 (0.25) | | Hexane, 50 | 7 | 25 | ...do | 5.7 | 39 | 6.1 | 1.4 |
| 4 | Tiba:Acac:H₂O 1:0.5:0.33 | 6.3 | 1.25 | PrO, 14.5 (0.25) | | do | 7 | 45 | ...do | 8.0 | 55 | 7.3 | 1.8 |
| 5 | Tiba:Acac:H₂O 1:0.5:0.33 | 6.3 | 1.25 | PrO, 14.5 (0.25) | | do | 24 | 45 | ...do | 12.2 | 84 | 9.3 | 2.5 |
| 6 | Tiba:Acac:H₂O 1:0.5:0.33 | 11.3 | 2.25 | PrO, 14.5 (0.25) | | Toluene, 49 | 7 | 55 | ...do | 12.7 | 88 | 7.0 | 1.7 |
| 7 | Tiba:Acac:H₂O 1:0.5:0.33 | 7.5 | 1.50 | PrO, 14.5 (0.25) | | Toluene, 43 | 7 | 55 | ...do | 11.4 | 79 | 6.6 | 1.6 |
| 8 | Tnpa:Acac:H₂O 1:0.5:0.33 | 7.5 | 1.50 | PrO, 14.5 (0.25) | | do | 7 | 55 | ...do | 11.5 | 80 | 9.8 | 2.6 |
| 9 | Tiba:Acac:H₂O 1:0.5:0.33 | 3.75 | 0.75 | PrO, 14.5 (0.25) | | Toluene, 42 | 24 | 65 | ...do | 12.8 | 89 | 4.8 | 1.0 |
| 10 | Tiba:Acac:H₂O 1:0.5:0.33 | 2.5 | 0.50 | PrO, 14.3 (0.25) | | Toluene | 24 | 75 | ...do | 10.2 | 69 | 4.6 | 1.0 |
| 11 | Tiba:Acac:H₂O 1:0.5:0.33 | 12.5 | 2.5 | IPGE, 29.0 (.25) | | Toluene, 70 | 24 / 48 | 25 / 45 | Rubber. | 17 | 58 | 5.4 | |
| 12 | Tiba:Acac:H₂O 1:0.5:0.33 | 37.5 | 7.5 | TPGMGE, 66.0 (.25) | | do | 48 | 55 | Soft, sticky rubber. | 48 | 72 | 3.4 | |
| 13 | Tiba:Acac:H₂O 1:0.5:0.33 | 20.0 | 2.0 | PrO, 23.3 (0.4) | EtO, 4.4 (0.1) | Toluene, 67 | 24 | 55 | Rubber. | 22.5 | 85 | 7.8 | [3] |
| 14 | Tiba:Acac:H₂O 1:0.5:0.33 | 10.0 | 1.67 | PrO, 8.7 (.15) | EtO, 6.6 (.15) | Toluene, 61 | 72 | 25 | ...do | 8.2 | 54 | 4.9 | [3] |
| 15 | Tiba:Acac:H₂O 1:0.5:0.33 | 10.0 | 2.0 | PrO, 8.7 (.15) | EtO, 4.4 (.10) | Toluene, 52 | 72 | 25 | ...do | 8.6 | 66 | 6.1 | [3] |
| 16 | Tiba:Acac:H₂O 1:0.5:0.33 | 10.0 | 1.67 | PrO, 12.2 (.21) | EtO, 4.0 (.09) | Toluene, 65 | 72 | 25 | ...do | 8.6 | 53 | 6.2 | |
| 17 | Tiba:Acac:H₂O 1:0.5:0.33 | 12.5 | 2.5 | 2,3-BuO, 18.0 (.25) | | Benzene, 50 | 48 | 55 | Tough snappy rubber. | 12.8 | 71 | 5.5 | [3] |
| 18 | Tiba:Acac:H₂O 1:0.5:0.33 | 12.5 | 2.5 | 1,2-BuO, 18.0 (.25) | | do | 48 | 55 | ...do | 17.8 | 99 | 5.9 | |
| 19 | Tiba:Acac:H₂O 1:0.5:0.33 | 10 | 2.0 | PrO, 14.5 (0.25) | | Toluene, 40 | 24 | 55 | ...do | 9.4 | 69 | 8.5 | 2.2 |
| 20 | Tiba:Acac:H₂O 1:0.75:0.33 | 10 | 2.0 | PrO, 14.5 (0.25) | | do | 24 | 55 | ...do | 13.8 | 95 | 11.3 | 3.1 |
| 21 | Tiba:Acac:H₂O 1:0.25:0.33 | 10 | 2.0 | PrO, 14.5 (0.25) | | do | 24 | 55 | ...do | 12.9 | 90 | 7.7 | 1.9 |
| 22 | Tiba:Acac:H₂O 1:0:0.33 | 12.5 | 2.5 | PrO, 14.5 (0.25) | | do | 24 | 55 | Sticky rubber. | 11.7 | 81 | 1.6 | 0.2 |
| 23 | Tiba:Acac:H₂O 1:0.5:0.33 | 10 | 2.0 | PrO, 14.5 (0.25) | | Dioxane, 40 | 24 | 55 | Soft, tacky rubber. | 12.6 | 87 | 4.8 | 1.1 |
| 24 | Dez:H₂O 1:0.8 | 15 | 3.0 | PrO, 11.6 (0.2) | MGE, 4.4 (0.05) | Toluene, 40 | 48 | 35 | Rubber. | 12.0 | 75 | 2.6 | [3] |
| 25 | Dez:H₂O 1:0.8 | 15 | 3.75 | PrO, 10.4 (0.18) | PGE 3.0 (.02) | do | 48 | 35 | ...do | 11.0 | 82 | 2.9 | |
| 26 | Tiba:Acac:H₂O 1:0.5:0.33 | 12.5 | 2.5 | PrO, 11.6 (0.20) | AGE, 5.7 (.05) | do | 24 | 45 | Tough snappy rubber. | 10.4 | 60 | 5.4 | |
| 27 | Tiba:Acac:H₂O 1:0.5:0.3 | 12.5 | 2.5 | PrO, 11.6 (0.2) | ECH, 4.6 (.05) | do | 24 / 24 | 45 | ...do | 8.9 | 55 | 6.1 | |

[1] ml. contains 0.5 millimoles metal alkyl.
[2] Molecular weight given in millions, thus Ex. 1 is 1,700,000.
[3] Catalyst destroyed with wet acetone but not washed out of product.

Abbreviations used in table:
Catalyst:
  Acac—acetyl acetone.
  Dez—diethyl zinc.
  Tiba—triisobutyl aluminum.
  Tnpa—tri-n-propyl aluminum.
Oxides:
  AGE—allyl glycidyl ether.
  1,2-BuO—1,2-butylene oxide.
  2,3-BuO—2,3-butylene oxide.
  ECH—epi-chlorohydrin.
  EtO—ethylene oxide.
  IPGE—isopropyl glycidyl ether.
  MGE—methyl glycidyl ether.
  PGE—phenyl glycidyl ether.
  PrO—propylene oxide.
  TPGMGE—tripropyleneglycol methyl glycidyl ether.

We have also discovered that the molecular weight of the polymer can be controlled by varying the mole ratio of the catalyst components such as by varying the ratio of metal alkyl to chelating agent to water. For example, by keeping the metal alkyl and water ratio constant and varying the chelating agent, one can control molecular weight.

The following Table II demonstrates how molecular weight can be controlled solely by varying the catalyst. In this catalyst system the mole ratio of acetyl acetone was varied from 0 to 1.25 moles/mole of triisobutyl aluminum. The water mole ratio was held constant as shown. As can readily be seen, the molecular weight of the polypropylene oxide could be varied from 160,000 to 3,100,000. A peak seemed to be achieved at a mole ratio of acetyl acetone of 0.75.

TABLE II

| Ex. | Catalyst System Mole Ratio | Metal Alkyl to oxide, mole percent | Monomer PrO, moles | Solvent, ml. | Reaction Time, hrs. | Temp. (°C.) | Product Yield g. | Percent | [η] dl./g. | MW.10⁻³ |
|---|---|---|---|---|---|---|---|---|---|---|
| 28 | Tiba:Acac:H₂O 1:0:0.33 | 2.0 | 0.125 | Benzene, 50 | 48 | 55 | 5.7 | 78 | 1.35 | 198 |
| 29 | Tiba:Acac:H₂O 1:0.0125:0.33 | 2.0 | 0.125 | do | 48 | 55 | 6.0 | 83 | 1.20 | 169 |
| 30 | Tiba:Acac:H₂O 1:0.0375:0.33 | 2.0 | 0.125 | do | 48 | 55 | 6.6 | 91 | 1.51 | 227 |
| 31 | Tiba:Acac:H₂O 1:0.075:0.33 | 2.0 | 0.125 | do | 48 | 55 | 6.6 | 91 | 2.28 | 388 |
| 32 | Tiba:Acac:H₂O 1:0.125:0.33 | 2.0 | 0.125 | do | 48 | 55 | 6.9 | 95 | 2.71 | 485 |
| 33 | Tiba:Acac:H₂O 1:0.175:0.33 | 2.0 | 0.125 | do | 48 | 55 | 6.7 | 92 | 4.06 | 819 |
| 34 | Tiba:Acac:H₂O 1:0.225:0.33 | 2.0 | 0.125 | do | 48 | 55 | 6.7 | 92 | 4.42 | 915 |
| 35 | Tiba:Acac:H₂O 1:0.33:0.33 | 2.0 | 0.125 | do | 48 | 55 | 6.6 | 91 | 5.78 | 1,340 |
| 36 | Tiba:Acac:H₂O 1:0.5:0.33 | 2.0 | 0.125 | do | 48 | 55 | 6.7 | 92 | 7.87 | 1,960 |
| 37 | Tiba:Acac:H₂O 1:0.75:0.33 | 2.0 | 0.125 | do | 48 | 55 | 6.9 | 95 | 11.30 | 3,100 |
| 38 | Tiba:Acac:H₂O 1:1.0:0.33 | 2.0 | 0.125 | do | 48 | 55 | 6.0 | 83 | 10.30 | 2,740 |
| 39 | Tiba:Acac:H₂O 1:1.25:0.33 | 2.0 | 0.125 | do | 48 | 55 | 4.3 | 60 | 9.50 | 2,500 |

It has also been observed that the molecular weight of other oxide homo- or copolymers could be varied by adjusting the mole ratio of the monomeric components in the catalyst system.

The following Table III describes a series of runs in which the ratio of propylene and ethylene oxide were varied from 95% propylene oxide and 5% ethylene oxide to 5% propylene oxide and 95% ethylene oxide. In all these runs the catalyst was destroyed with wet acetone, and was not washed out of product. Solvents were removed by evaporation under reduced pressure as before, however, the catalyst residue remained in the product.

Similarly, the material or materials employed as the demulsifying agent of our process are often admixed with a mixture of the above solvents or other solvents customarily used in connection with the conventional demulsifying agents. The compositions of this invention may be used alone or in admixture with other suitable demulsifying agents.

The ultrahigh molecular weight polymers of this invention can be employed in solution, in suspension in such solvents as water, etc., in solid form such as in the form of sticks, pellets, chunks, etc., either alone or as a co-solvent solid such as in a solid solution in naphtha-

TABLE III

| Ex. | Catalyst System Mole Ratio | mole percent Metal Alkyl to Oxide | Monomer PrO, moles | EtO, moles | mole ratio PrO:EtO | Solvent, ml. | Reaction Time hrs. | Temp. (°C.) | Yield (gl.) | percent | Product PrO:Eto,¹ mole ratio | Remarks | [I.η.] dl./g. |
|---|---|---|---|---|---|---|---|---|---|---|---|---|---|
| 40 | Tiba: Acac: H₂O 1:0.5:0.33 | 2.0 | 0.285 | 0.015 | 95:5 | Benzene, 47 | 48 | 55 | 17.2 | 98 | 96:4 | Tough, snappy rubber. | |
| 41 | Tiba:Acac:H₂O 1:0.5:033 | 2.0 | 0.255 | 0.045 | 85:15 | Benzene 45 | 48 | 55 | 16.5 | 98 | 87.13 | do | 7.6 |
| 42 | Tiba:Acac:H₂O 1:0.5:0.33 | 2.0 | 0.225 | 0.075 | 75:25 | Benzene, 44 | 48 | 55 | 16.1 | 99 | 75:25 | do | |
| 43 | Tiba:Acac: H₂O 1:0.5:0.33 | 2.0 | 0.195 | 0.105 | 65:35 | Benzene, 42 | 48 | 55 | 15.5 | 97.5 | 66:34 | do | |
| 44 | Tiba: Acac: H₂O 1:0.5:0.33 | 2.0 | 0.165 | 0.135 | 55:45 | Benzene, 41 | 48 | 55 | 15.5 | 100 | 57:43 | do | |
| 45 | Tiba: Acac: H₂O 1:0.5:0.33 | 2.0 | 0.135 | 0.165 | 45:55 | Benzene, 40 | 48 | 55 | 14.2 | 94 | 45:55 | do | |
| 46 | Tiba:Acac: 1:0.5:0.33 | 2.0 | 0.105 | 0.145 | 35:65 | Benzene 38 | 48 | 55 | 13.5 | 92 | 36:64 | do | |
| 47 | Tiba:Acac: H₂O 1:0.5:0.33 | 2.0 | 0.075 | 0.225 | 25:75 | Benzene 36 | 48 | 55 | 13.7 | 96 | 25:75 | Tough rubber. | |
| 48 | Tiba:Acac:H₂O 1:0.5:0.33 | 2.0 | 0.045 | 0.255 | 15:85 | Benzene, 35 | 48 | 55 | 13.2 | 96 | 15:85 | do | |
| 49 | Tiba:Acac:H₂O 1:0.5:0.33 | 2.0 | 0.015 | 0.285 | 5:95 | Benzene, 34 | 48 | 55 | 13.0 | 97 | 5:05 | do | |

¹ Found by nuclear magnetic resonance spectroscopy.

These polymers employed in the treatment of oil field emulsions are used as such, or are preferably diluted with any suitable solvent, for example, aromatic solvents, such as benzene, toluene, xylene, tar acid oil, sulfur dioxide extract obtained in the refining of petroleum, cresol, anthracene oil, etc. Alcohols, particularly aliphatic alcohols, such as methyl alcohol, ethyl alcohol, denatured octyl alcohol, etc., are often employed as diluents. Miscellaneous solvents, such as pine oil, acetone, carbon tetrachloride, etc., can also be employed as diluents.

lene and the like, etc. These sticks may be employed down-hole. Since the compositions of this invention are frequently used in a ratio of 1 to 10,000, or 1 to 20,000, or 1 to 30,000, or 1 to 40,000, or 1 to 50,000, as in desalting practice, an apparent insolubility in oil is not significant, because said compositions undoubtedly have some solubility within such concentrations.

In practicing our process for resolving petroleum emulsions of the water-in-oil type, a treating agent or demulsifying agent of the kind herein described is brought into contact with or caused to act upon the emulsion to be treated, in any of the various apparatus now generally used to resolve or break petroleum emusions wit ha chemical reagent, the above procedure being used alone or in combination with other demulsifying procedures, such as the electrical dehydration process.

One type of procedure is to accumulate a volume of emulsified oil in a tank and conduct a batch treatment type of demulsification procedure to recover clean oil. In this procedure the emulsion is admixed with the demulsifier, for example by agitating the tank of emulsion and slowly dripping demulsifier into the emulsion. In some cases mixing is achieved by heating the emulsion while dripping in the demulsifier, depending upon the convection currents in the emulsion to produce satisfactory admixture. In a third modification of this type of treatment, a circulating pump withdraws emulsion from, e.g. the bottom of the tank, and re-introduces it into the top of the tank, the demulsifier being added, for example, at the suction side of said circulating pump.

In a second type of treating procedure, the demulsifier is introduced into the well fluids at the well-head or at some point between the well-head and the final oil storage tank, by means of an adjustable proportioning mechanism or proportioning pump. Ordinarily the flow of fluids through the subsequent lines and fittings suffices to produce the desired degree of mixing of demulsifier and emulsion, although in some instances additional mixing devices may be introduced into the flow system. In this general procedure, the system include various mechanical devices for withdrawing free water, gas separating entrained water, or accomplishing quiescent settling of the chemicalized emulsion. Heating devices may likewise be incorporated in any of the treating procedures described herein.

A third type of application (down-the-hole) of demulsifier to emulsion is to introduce the demulsifier either periodically or continuously in diluted or undiluted form into the well and to allow it to come to the surface with the well fluids, and then to flow the chemicalized emulsion through any desirable surface equipment, such as employed in the other treating procedures. This particular type of application is decidedly useful when the demulsifier is used in connection with acidification of calcareous oil-bearing strata, especially if suspended in or dissolved in the acid employed for acidification.

In all cases, it will be apparent from the foregoing description, the broad process consists simply in introducing a relatively small proportion of demulsifier into a relatively large proportion of emulsion, admixing the chemical and emulsion either through natural flow or through special apparatus, with or without the application of heat, and allowing the mixture to stand quiescent until the desirable water content of the emulsion separates and settles from the mass.

The following is a typical installation:

A reservoir to hold the demulsifier of this invention is placed as the well-head where the effluent liquids leave the well. This reservoir or container, which may vary from about a gallon to 50 gallons or more for convenience, is connected to a proportioning pump which injects the demulsifier drop-wise into the fluids leaving the well. Such chemicalized fluids pass through the flowline into a settling tank. The settling tank consists of a tank of any convenient size, for instance, one which will hold amounts of fluid produced in 4 to 24 hours (500 barrels to 2000 barrels capacity), and in which there is a perpendicular conduit from the top of the tank to almost the very bottom so as to permit the incoming fluids to pass from the top of the settling tank to the bottom, so that such incoming fluids do not disturb stratification which takes place during the course of demulsification. The settling tank has two outlets, one being below the water level to drain off the water resulting from demulsification or accompanying the emulsion as free water, the other being an outlet at the top to permit the passage of dehydrated oil to a second tank, being a storage tank, which holds pipeline or dehydrated oil. If desired, the conduit or pipe which serves to carry the fluids from the well to the settling tank may include a section of pipe with baffles to serve as a mixer, to insure thorough distribution of the demulsifier throughout the fluids, or a heater for raising the temperature of the fluids to some convenient temperature, for instance, 120° to 160° F., or both heater and mixer.

Demulsification procedure is started by simply setting the pump so as to feed a comparatively large ratio of demulsifier, for instance, 1:10,000. As soon as complete "break" or satisfactory demulsification is obtained, the pump is regulated until experience shows that the amount of demulsifier being added is just sufficient to produce clean or dehydrated oil. The amount being fed at such stage is usually 1:10,000, 1:20,000, 1:50,000, or the like, However, with extremely difficult emulsions higher concentrations of demulsifier can be employed.

These ultrahigh molecular weight polymers can be employed alone, in solution or in conjunction with other chemical demulsifiers. As will be shown in subsequent examples, the polymers of this invention often form synergistic mixtures when combined with demulsifiers commonly in use today.

In recent years pipe line standards for oil have been raised so that an effective demulsifier must not only be able to break oil field emulsions under conventional conditions without sludge, but at the same time it must also yield bright pipeline oil, i.e., pipeline oil that is free from the minute traces of foreign matter, whether suspended water or suspended emulsion droplets due to nonresolvable solids. In addition the water phase should be free of oil so as not to create a disposal problem. Thus it is presently desirable to use a demulsifier that produces absolutely bright, haze-free oil in the top layer, yields little or no interphasial sludge, and has little of any oil in the water phase.

The following demulsification examples are presented for purposes of illustration and not of limitation. This invention is illustrated with ultrahigh molecular weight polyoxyalkylene polymers.

EXAMPLES

The ultrahigh molecular weight polyoxyalkyleneglycols are superior reagents for resolving water-in-oil emulsions. The method employed for evaluating these materials is the "Bottle Test" described in "Treating Oil Field Emulsions," second edition, issued by Petroleum Extension Service and the Texas Education Agency in cooperation with the American Petroleum Institute, 1955 (revised 1962), pages 39–44.

The effectiveness of the present demulsifiers is based on their ability to resolve oil field emulsion with a minimum amount of reagent to yield bright oil that is essentially free of water and unresolved emulsion and meets pipeline specification (normally less than 1% BS & W). Of particular advantage is the ability of the present demulsifiers to break petroleum emulsions very rapidly in comparison with conventional demulsifiers.

An emulsion was taken from the Little Buffalo Basin Wyoming, Pan American Petroleum Corporation, Tensleep #1 lease, well #26, containing 12% water. The demulsifier was added as a 1% solution to 100 ml. of the warmed emulsion (160° F.). It was shaken for four minutes (120 shakes/min.) and then allowed to quietly settle for four hours. The resultant top oil was then analyzed for water. A 1% solution of the product of Ex. 13 gave clean oil containing 0.8% water when 0.8 cc. of reagent was used and 0.6% water when 1.0 cc. was used. This is considerably better than commercially available products. For example, when 2.0 cc. of the diglycollic ester of polypropylene glycol (2000 MW) was used (commercial compound A), the oil contained 3.2% water (polypropyleneglycol 2000 itself gave no treatment).

Other low molecular weight demulsifiers made by esterifying conventional polyoxyalkylene glycols were likewise relatively ineffective, i.e. the diglycollic ester of the block copolymer made by adding ethylene oxide to polypropyleneglycol 2000 such that the product contains 20% ethylene oxide (commercial compound B). In addition, a low molecular weight oxyalkylated polyalkyleneamine (commercial compound C) was relatively ineffective. Results on this oil are summarized in the following table.

TABLE IV

| Cpd. of Ex. | Ml. of 1% Soln. | Percent Water in Treated Oil |
|---|---|---|
| Commercial Cpd. A | 2.0 | 3.2 |
| Commercial Cpd. B | 2.0 | 1.4 |
| Commercial Cpd. C | 2.0 | 1.6 |
| Commercial Cpd. B | 1.0 | 3.0 |
| Polymer Ex. 24 | 1.0 | 0.8 |
| Polymer Ex. 13 | 1.0 | 0.6 |
| Polymer Ex. 11 | 0.8 | 0.8 |
| Polymer Ex. 13 | 0.6 | 0.8 |

This table shows that polymers of this invention are at least more than twice as effective as the closest commercial composition.

Heretofore, a wide variety of surface active compounds have been used for breaking crude oil emulsions and the number of actual compounds and compositions disclosed for this purpose runs into the thousands. They range from simple soaps, sulfates, and sulfonates to complex products of uncertain structure defined by the methods of preparation. They include anionic, cationic, ampholytic, and non-ionic agents, and even mixtures of the different major classes of surface active agents. They range in properties from low molecular weight compounds to polymeric products. Among these materials are the relatively simple sulfated and sulfonated compounds such as the Teepols, polyalkylbenzenesulfonates, and the sulfonated simple terpenes. Petroleum sulfonates such as the mahogany and green sulfonates have also been used successfully both alone and in conjunction with simple nonionic detergents. Among the most versatile and successful emulsion breakers for crude petroleum are the organic amine salts of mahogany sulfonates and alkylaromaticsulfonates. Both the simple amines and long-chain or complex amines of high surface activity have been used in this connection. The carboxylic acid soaps both alone and in conjunction with auxiliaries have been successful in resolving crude oil emulsions of certain types. Simple nonionic surfactants of the polyethenoxy type, as well as the polymeric ester types of nonionics have been employed as emulsion breakers. A relatively large number of cationic surfactants are effective crude petroleum emulsions breakers. Among these materials are the long-chain fatty imidazolines, the polymerized amino alcohols, amine derivatives of chlorinated paraffin, as well as more complex amine derivatives. Among the ampholytic surfactants, the aspartic esters are stated to be good demulsifying agents, and crude oil emulsions have also been broken by aminated petroleum sulfonates.

The diversity of surfactants employed as demulsifiers is illustrated by the following list of patents describing such demulsifiers which is presented for purposes of illustration and not of limitations. They are by reference incorporated into this application as if part hereof:

2,499,365; 2,695,882; 2,695,885-6-7-8-9-90-91; 2,-695,917; 2,695,883-4; 2,695,909; 2,671,762; 2,457,735; 2,492,473; 2,540,437; 2,646,404; 2,653,135; 2,653,137; 2,653,136; 2,543,223; 2,443,273; 2,427,326; 2,562,878; 2,557,081; 2,615,853; 2,422,177; 2,442,073-4-5-6-7; 2,-646,405-6; 2,589,198-9; 2,589,200-1; 2,407,895; 2,425,-175; 2,472,573-4; 2,435,810; 2,454,382; 2,943,071; 2,950,-310; 2,950,313; 1,944,021, etc.

Although the ultrahigh molecular weight polymers of this invention are effective when employed alone, they also act synergistally with other surfactants. Thus, when the polymers of this invention are employed with various surfactants which are good demulsifiers, or in many instances are only average demulsifiers, the mixture unexpectedly yields an excellent demulsifier through synergism.

Preferred examples are the oxyalkylated resins of U.S. Patent 2,499,365, the polyesters of the type described in 2,563,878, and the sulfates and sulfonates of the type described in 1,944,021. These are by reference incorporated herein as if part hereof.

The ratio of ultrahigh molecular weight polymer to surfactant may vary widely depending on the components, the system, etc., from about 1:99 to 99:1, for example, for about 10:90 to 90:10, such as from about 25:75 to 75:25, but preferably from 90:60 to 60:40.

The following examples are presented to illustrate this synergistic effect of mixtures. The emulsion used is that of Table IV.

TABLE V

| Composition | Ml. of 1% Soln. | Percent Water in Treated Oil |
|---|---|---|
| Composition of Ex. 13 | 0.6 | 0.8 |
| Commercial Cpd. D [1] | 0.6 | [2] |
| Commercial Cpd. E [3] | 0.6 | 3.6 |
| Blend: 40% Ex. 13; 60% Cpd. D | 0.6 | 0.4 |
| Blend: 40% Ex. 13; 60% Ex. E | 0.6 | 1.0 |

[1] Oxyalkylated resin made according to U.S. 2,499,365, (resin Ex. 1a + equal weight EtO).
[2] Very poor treatment, only a trace of water separated from the emulsion.
[3] Ester made according to U.S. 2,562,878 (diglycollic polyester of polyPrO 2,000).

The following Table VI demonstrates the effect of varying the propylene oxide/ethylene oxide ratios in the copolymer series described in Examples 40–49. As can be noted, the treating effectiveness starts to drop off steeply on this emulsion at 55% ethylene oxide. The same emulsion was used as above.

TABLE VI

| | Ml. of 1% Soln. | Percent Water in Treated Water |
|---|---|---|
| Compound of Ex.: | | |
| 40 | 1.0 | 1.0 |
| 41 | 1.0 | 0.6 |
| 42 | 1.0 | 0.6 |
| 43 | 1.0 | 0.6 |
| 44 | 1.0 | 1.2 |
| 45 | 1.0 | 2.8 |
| 46 | 1.0 | [1] |
| 47 | 1.0 | [1] |
| 48 | 1.0 | [2] |
| 49 | 1.0 | [2] |

[1] Poor treatment, only a small amount of water separated from the emulsion.
[2] Poor treatment, essentially no water separated from the emulsion.

Another emulsion from the same field (Tensleep #2 lease, well #24 containing 72% water) was treated using the above procedure with the following results.

TABLE VII

| | Ml. of 1% Soln. | Percent Water in Treated Oil |
|---|---|---|
| Compound of Ex.: | | |
| 2 | 1.0 | 0.5 |
| 4 | 1.0 | 0.4 |
| 11 | 1.0 | 0.3 |
| 13 | 1.0 | 0.5 |
| 20 | 1.0 | 0.5 |
| 2 | 0.8 | 0.8 |
| 4 | 0.8 | 0.3 |
| 11 | 0.8 | 0.3 |
| 13 | 0.8 | 0.5 |
| 20 | 0.8 | 0.5 |
| 2 | 0.6 | 0.8 |
| 4 | 0.6 | 0.4 |
| 11 | 0.6 | 0.9 |
| 13 | 0.6 | 0.9 |
| 20 | 0.6 | 0.8 |
| Commercial Compound: | | |
| A | 1.0 | 4.4 |
| B | 1.0 | 1.8 |
| C | 1.0 | 1.0 |

The action of our demulsifiers is rapid on the above emulsion (Table VII). For example, all compounds of this invention gave immediate water drop in contrast to the slower action of commercial materials. Thus, by employing our demulsifiers 90% of all water was taken out of the emulsion within 1–10 minutes after agitation was completed.

An emulsion (Morg Dartland Field, Homestate Oil Company, well #21, containing 51% water), was treated at ambient temperatures for one hour after shaking the emulsion with the demulsifier for 100 shakes to give the following results.

TABLE VIII

|  | Ml. of 1% Soln. | Percent Water in Treated Oil |
|---|---|---|
| Compound of Ex.: | | |
| 9 | 0.8 | 0.1 |
| 18 | 0.8 | 0.5 |
| 22 | 0.8 | 0.4 |
| 25 | 0.8 | 0.8 |
| 26 | 0.8 | 0.8 |
| 27 | 0.8 | 1.0 |
| Compound: | | |
| A | 0.8 | 4.8 |
| B | 0.8 | 5.4 |
| C | 0.8 | 2.8 |
| Compound of Ex.: | | |
| 9 | 0.4 | 0.6 |
| 18 | 0.4 | 1.0 |
| 22 | 0.4 | 0.8 |

An emulsion produced by the L. H. Foster Oil Co., Scott Lease, well #2, containing 68% water was tested as above in the immediately preceding example.

TABLE IX

|  | Ml. of 1% Soln. | Percent Water in Treated Oil |
|---|---|---|
| Compound of Ex.: | | |
| 9 | 1.0 | 0.2 |
| 20 | 1.0 | 0.2 |
| 22 | 1.0 | 0.5 |
| 23 | 1.0 | 0.6 |
| Commercial Compound: | | |
| A | 1.0 | 3.6 |
| B | 1.0 | 1.6 |
| Compound of Ex.: | | |
| 9 | 0.4 | 1.0 |
| 20 | 0.4 | 1.6 |
| 22 | 0.4 | 2.0 |
| 23 | 0.4 | 1.8 |
| Commercial Compound: | | |
| A | 0.4 | 13.2 |
| B | 0.4 | 20.8 |

OTHER USES

Because of their demulsification properties, the compounds of our invention are also useful in preventing the formation of emulsions such as occurs for example during transit or storage. Oil may pick up extraneous water during transit through pipelines, storage in tanks and during transportation in sea-going tankers, and the like. This oil may be dehydrated crude or may be refined products such as lube oil, kerosene, fuel oil or the like.

The polymers of our invention may also be used to prevent emulsification during acidizing.

They may also be used to treat down hole before the emulsion is formed. For example, the products of this invention may be made as a solid solution in naphthalene in convenient sized pellets and then used down hole. By adjustment of the amount of naphthalene (or other components), a controlled rate of dissolution in the crude oil may be achieved. Particles of demulsifier of controlled size may also be injected into the formation in water flooding, in hydrofracing, etc.

The products of this invention may also be of value as thickening agents for hydrocarbon systems. For example, in one form of oil well fracturing, a gelled hydrocarbon is injected into the oil bearing formation under pressure to fracture it and facilitate the production of crude oil.

These products are most valuable when blended with wax, for example, microcrystalline and/or paraffin wax. In this respect they serve two purposes. First, they increase the viscosity of wax blends and thus minimize the absorption of wax in the paper when used for lamination. Less wax can then be used, or thicker layers of wax can be placed between the sheets of paper, metal foil or plastic sheets. A better moisture vapor barrier is therefore formed. Secondly, the ultrahigh molecular weight polyalkylene glycols of this invention greatly enhance the laminating strength of microcrystalline and/or paraffin blends (other additives may also advantageously be employed). This is believed due to increased cohesive and adhesive strengths. For example, the product of Example 18 when blended with a microcrystalline wax, Ultraflex (Bareco Wax Company), significantly increased laminating strength when only 2% was added. Because of increased viscosity it was not advantageous to use more than about 3 or 4% of this material using conventional wax coating equipment. The product of Example 17 similarly enhances laminating strength. The more hydrophilic polymers of this invention are not advantageously used since they are not completely wax soluble. This includes even the higher molecular weight polypropylene oxides. Larger amounts of lower molecular weight polymers can be blended into wax, whereas only smaller amounts of high molecular weight products can be used. Normally it is advantageous to mill the polymer into wax at a high concentration, i.e. 10–20% and then use this concentrate to blend into wax to make the final blend. Alternatively the wax can be blended with a solution of the polymer in hydrocarbon solvent and the solvent then removed by distillation.

As is quite evident, new ultrahigh molecular weight polymers will be constantly developed which could be useful in our invention. It is, therefore, not only impossible to attempt a comprehensive catalogue of such polymers, but to attempt to describe the invention in its broader aspects in terms of specific polymers used would be too voluminous and unnecessary since one skilled in the art could by following the description of the invention herein select a useful polymer. This invention lies in the use of suitable polymers in demulsification and their individual compositions are important only in the sense that their properties can affect this function. To precisely define each specific useful polymer in light of the present disclosure would merely call for chemical knowledge within the skill of the art in a manner analogous to a mechanical engineer who prescribes in the construction of a machine the proper materials and the proper dimensions thereof. From the description in this specification and with the knowledge of a chemist, one will know or deduce with confidence the applicability or specific polymers suitable for this invention by applying them in the demulsification process set forth herein. In analogy to the case of a machine, wherein the use of certain materials of construction or dimensions of parts would lead to no practical useful result, various materials will be rejected as inapplicable where others would be operative. We can obviously assume that no one will wish to use a useless polymer nor will be misled because it is possible to misapply the teachings of the present disclosure to do so. Thus, any polymer that can perform the function stated herein can be employed.

Having thus described our invention what we claim as new and desire to obtain by Letters Patent is:

1. A process of controlling the molecular weight of an oxyalkylene polymer having a molecular weight of 100,000–10,000,000, said polymer being a copolymer of a hydrophobic alkylene oxide and a hydrophilic alkylene oxide which contains more than 50 mole percent hydrophobic alkylene oxide, said alkylene oxides being free of groups other than oxirane groups, wherein the alkylene oxides are contacted with an alkyl metal-chelate-water catalyst under polymerization conditions characterized by using a minor amount of water to alkyl metal in the presence of varying amounts of chelate, the ratio of water and alkyl metal being constant, said metal being selected from the group consisting of aluminum and zinc.

2. The process of claim 1 where the catalyst is aluminum alkyl, acetylacetone and water.

References Cited

UNITED STATES PATENTS

| | | |
|---|---|---|
| 3,029,216 | 4/1962 | Bailey. |
| 3,135,705 | 6/1964 | Vandenberg. |
| 3,203,955 | 8/1965 | Jackson et al. |
| 3,256,211 | 6/1966 | Bailey. |

WILLIAM H. SHORT, Primary Examiner

T. PERTILLA, Assistant Examiner

U.S. Cl. X.R.

260—47. 88.3